E. M. SMITH.
ARTIFICIAL FISH BAIT.
APPLICATION FILED NOV. 13, 1919.

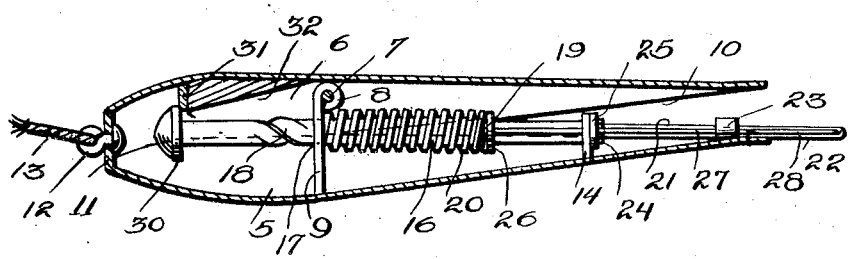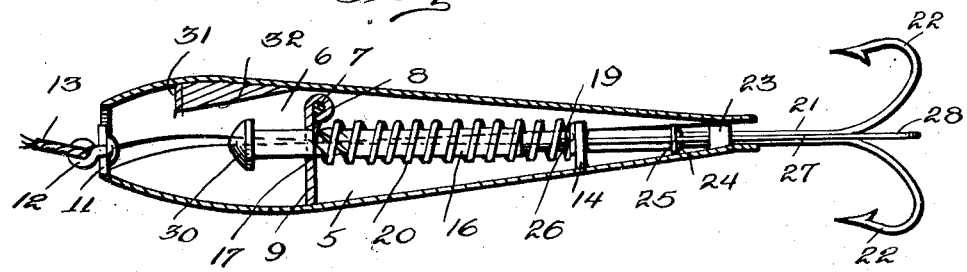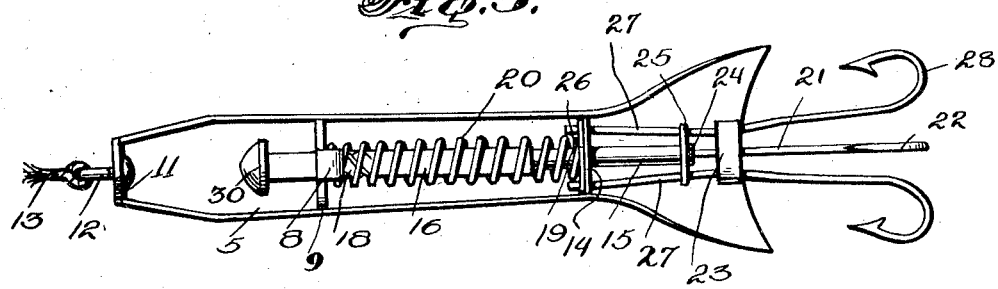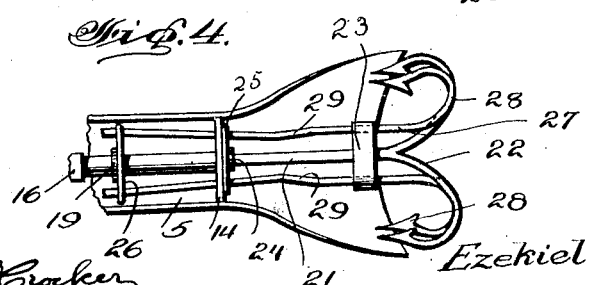

1,355,858.

Patented Oct. 19, 1920.
2 SHEETS—SHEET 2.

WITNESSES
Ernest P. Crocker

INVENTOR
Ezekiel M. Smith
BY Munn & Co.
ATTORNEYS

UNITED STATES PATENT OFFICE.

EZEKIEL M. SMITH, OF BIRMINGHAM, ALABAMA.

ARTIFICIAL FISH-BAIT.

1,355,858.  Specification of Letters Patent.  Patented Oct. 19, 1920.

Application filed November 13, 1919. Serial No. 337,716.

*To all whom it may concern:*

Be it known that I, EZEKIEL M. SMITH, a citizen of the United States, and a resident of Birmingham, in the county of Jefferson and State of Alabama, have invented a certain new and useful Improvement in Artificial Fish-Bait, of which the following is a specification.

One of the principal objects of the invention is to provide an improved artificial bait, designed particularly for trolling purposes in weedy waters, the bait being so constructed that the hooks are normally housed whereby to be protected from engagement with any weeds or other obstruction in the water, the device operating when the bait is swallowed by a fish to release the hooks and allow the latter to move into exposed position for hooking the fish.

A further object of the invention is to provide an improved fish bait of the class described, which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 represents a view in section taken vertically and longitudinally through a bait constructed according to my invention, showing the bait in set position;

Fig. 2 represents a similar view showing the bait in sprung or released position;

Fig. 3 represents a plan view of the lower portion of the bait, the cover or upper portion being removed;

Fig. 4 represents a fragmentary plan view showing the hooks in housed position;

Figure 5:
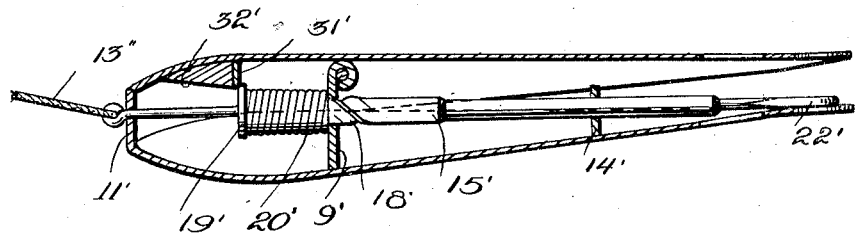
Fig. 5 represents a view in section taken vertically and longitudinally through a modified form of bait.
Figure 6:
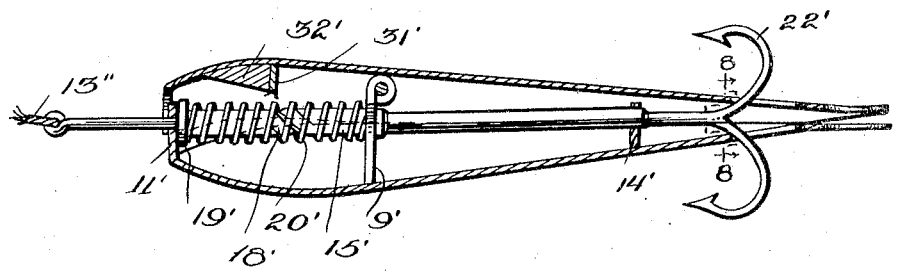
Fig. 6 represents a similar view showing the bait in sprung position.

Referring more particularly to the drawings, the bait includes a substantially cylindrical body comprising a lower semi-cylindrical portion 5 and an upper semi-cylindrical portion 6 hingedly mounted for movement relatively to the lower body portion upon a transverse pin 7 set in the overturned or beaded upper edge 8 of a transverse partition 9 mounted in the lower body portion as clearly shown. The rear portion of the side walls of upper body portion 6 are beveled as at 10 to allow pivotal movement of the upper body portion upon the pin 7 relatively to the lower body portion. This body portion 5 at its forward end is provided with a head or closure 11 on which an eye 12 is mounted. The line 13 for drawing the bait through the water may be connected with the eye 12.

Arranged in the body portion 5 rearwardly of the partition 9, is a second partition 14, which coöperates with the partition 9 in forming a guideway and journal for a longitudinally extending shaft 15. The forward portion of this shaft is squared as at 16, and extends through a squared opening 17 provided in the partition 9. The shaft is twisted as at 18 adjacent the partition, so that, as the shaft is moved longitudinally of the body of the bait, it will be rotated through an angle of 90°. Fixed on the shaft 15, in advance of the rear partition 14, is a collar 19 between which and the partition 9 is interposed a coiled spring 20 which exerts a tension upon the shaft 15 tending to move the latter rearwardly relatively to the body of the bait.

The rear end of the shaft 15 has fixed thereto, or forming a part thereof, a shank 21 which at its rear end is bifurcated and formed into oppositely extending hooks 22. These hooks, it will be understood, move with the shaft or rod 15, so that as the rod rotates through its angular movement of 90°, the hooks likewise move with the rod as an axis through an angle of 90°. The shank 21 extends through a guide 23 secured on the body portion 5 adjacent the rear end of the latter.

A collar 24 is fixed on the shaft 15 in advance of the guide 23, and in advance of the collar 24 is arranged a cross piece 25 with respect to which the shaft 15 is rotatable. A second cross piece 26 through which the shaft is rotatable, is arranged between the collar 19 and the rear partition 14. Secured to these cross pieces on opposite sides of the shaft 15, are the shanks 27 of the non-rotatable hooks 28. The shanks 27 are guided through openings in the rear partition 14, and also extend through the guide 23. As the shaft 15 moves forwardly and rearwardly, the hooks 28 will be moved forwardly and rearwardly through the contact of the collars 24 and 19 with the cross pieces 25 and 26 respectively, but the hooks will not turn with the shaft, being confined to a reciprocal movement. The hooks 22 will of course rotate with the shaft and will, when the latter is moved forwardly, be brought into flat position in relatively coplanar relation with the hooks 28, as shown in Fig. 4.

The upper and the lower body portions at their rear ends are flared as shown in Fig. 3, to represent the tail of a minnow or fish, and between these flared tail portions of the body, the points of the hooks 22 and 28 are drawn when the shaft 15 is moved forwardly, as clearly shown in Fig. 4, whereby to be housed and protected from engagement with weeds or other obstructions in the water through which the bait is being drawn. The shanks 27 of the hooks 28 have bent or offset portions 29 which act as cams against the ends of the guide 23, when the rod 15 is moved forwardly, for drawing the hooks 28 closer together when they are in housed position within the tail of the bait. When the rod moves rearwardly the cam portions 29 move beyond the guide 23, and allow the hooks 28 to spread.

The forward end of the rod or shaft 15, beyond the partition 9, is provided with a circular cap 30 adapted to engage, when the shaft 15 is moved forwardly, behind a lug 31 depending from the roof of the upper body portion 6. An inclined surface 32 extends from the lower edge of the lug 31 rearwardly and upwardly toward the roof of the body portion 6.

To set the bait, the body portions are grasped in one hand and the forward ends of the body portions are pressed together. At the same time the other hand is used in bearing against the hooks for shifting the rod 15 forwardly. This shifting movement of the rod or shaft carries the hooks forwardly, and at the same time effects a turning movement of the rod, so that the hooks 22 will be moved into coplanar relation with the hooks 28. A continued movement of the rod will house the ends of the hooks between the tail portions of the body sections, as indicated in Fig. 4, and will effect an engagement of the cap 30 behind the lug 31. The parts will be in this position as the bait is drawn through the water. When a fish attempts to swallow the bait, the pressure of its mouth upon the rear or tail portions of the body sections, will tend to close the tail portions together, hence moving the lug 31 upwardly whereby to release the cap. The spring 20 will immediately shift the rod or shaft rearwardly, to expose the hooks, and at the same time will cause the rotation of the rod through its arc of 90° for bringing the hooks 22 into right angular relation with the hooks 28, so that all of the hooks will embed themselves in the mouth of the fish, and securely hold the latter.

In the modified form shown in Figs. 5 to 8 inclusive, the shaft 15' is extended forwardly through the closure 11', and is equipped with an eye to which the line 13' is connected. The shaft in advance of the partition 9' is provided with a collar 19' between which and the partition 9' the spring 20' is interposed. The normal tendency of the spring, therefore, is to move the shaft 15' forwardly. This shaft may be retained in set rear position by engagement of the collar 19' behind the lug 31', which lug and inclined surface 32' are arranged in opposite relation to the position shown in the form illustrated in Fig. 1.

Figure 7:
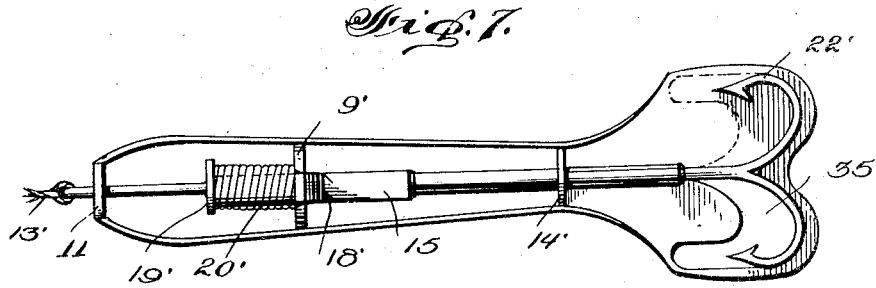
Fig. 7 represents a plan view of the lower portion of the bait, the hooks being shown in housed position.
Figure 8:
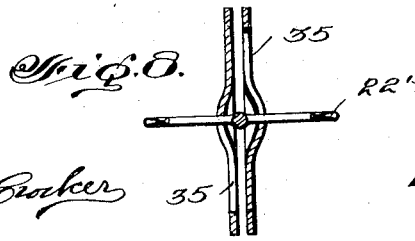
Fig. 8 represents a view in section taken on the plane indicated by the line 8—8 of Fig. 6, looking in the direction indicated by the arrows.

In the modified form the hooks 28 are preferably done away with, only the hooks 22' which turn with and are affixed to the shaft 15', being employed. When the bait constructed according to the modified form is in set position, as indicated in Fig. 5, the hooks 22' are housed between the tail portions of the body sections, but when these tail portions are compressed by the action of a fish biting against the bait, the lug 31' will be released from the collar 19', and the shaft will be projected forwardly by the spring and will be caused to turn through an angle of 90° through the coaction of the twisted shank portion 18' and the squared opening in the partition 9'. This will cause the hooks 22' to move outwardly through arcuate slots or openings 35 cut each in one of the tail portions of the body segment. At the same time that the hooks are sprung outwardly to lie at right angles to the tail portions of the body, they will be moved forwardly as the shaft is moved forwardly under the action of the spring. It will be understood that each tail section or portion is provided with one of the slots, as indicated in Fig. 7.

To reset the modified form of the bait, the forward portions of the body members are moved toward each other, and the forwardly extended portion of the shaft 15' is pressed so as to move the shaft rearwardly until the collar 19' engages behind the lug 31'.

Although I have described the preferred embodiments of my invention, I may desire to make such changes in the construction, combination, and arrangement of parts thereof, as do not depart from the spirit of the invention and the scope of the appended claims.

I claim:

1. An artificial bait including a pair of substantially semi-cylindrical body segments connected together on a transverse pivot, a shaft slidably mounted for longitudinal movement on one of the body segments, said shaft being movable into set and into extended positions, a spring tending to move the shaft into extended position, means for effecting a partial rotation of the shaft through an arc of ninety degrees upon movement of the shaft from set to extended position and vice versa, a pair of hooks fixed on the shaft, said hooks being housed between the body segments when the shaft is in set position, and being exposed when the shaft is in extended position, a second pair of hooks movable longitudinally with the shaft into housed and exposed positions, said shaft being rotatable relatively to the said second pair of hooks, a cap on the shaft, and a lug on one of the body segments engageable with the cap, when the forward portions of the body segments are moved together, for holding the shaft in set position, said lug adapted to release the shaft when the rear portions of the body segments are moved together.

2. An artificial bait including a pair of substantially semi-cylindrical body portions connected together intermediate their ends on a transverse pivot, a shaft slidably mounted within the body segments and being movable into retracted and extended positions relatively to the body, coöperating means between the shaft and one of the body segments for locking the shaft in retracted position when those portions of the body segments on one side of the pivot are moved together, and operating to release the shaft when the portions of the body segments on the opposite side of the pivot are moved together, resilient means normally tending to move the shaft into extended positions, hooks fixed on and movable with the shaft, said hooks being in housed position between the body segments when the shaft is in retracted position, and being exposed when the shaft is in extended position, and means for effecting a partial rotation of the shaft in its movement from retracted to extended position and vice versa.

3. An artificial bait including a hollow body, a shaft arranged therein movable longitudinally into retracted and extended positions relatively to the body, hooks carried on the shaft and housed within the body when the shaft is in retracted position, means for effecting rotation of the shaft in its movements from retracted to extended positions and vice versa, other hooks movable longitudinally with the said shaft into housed and exposed positions, the shaft being rotatable relatively to the said other hooks.

4. An artificial bait including a body, a pair of sets of hooks movable into housed and exposed positions relatively to the body, means for effecting movements of the hooks, and means for effecting a rotation of one set of hooks relatively to the other set as the hooks move from housed to exposed positions and vice versa, whereby when the hooks are in housed position they will lie in substantially coplanar relation and when they are in exposed position the said hooks will lie at an angular relation to each other.

5. An artificial bait including a body, having a tail portion, a pair of hooks movable into housed position and exposed position relatively to the tail portion of the body, said hooks when in housed position lying in coplanar relation with the tail portion of the body, and means for effecting a rotary movement of the hooks into angular position relatively to the tail portion of the body when the hooks are moved into exposed position.

6. An artificial bait including a body, a pair of hooks movable into housed position and exposed position relative to said body, means for effecting movement of said hooks to exposed position and means for imparting a rotary movement to said hooks about an axis parallel to the longitudinal axis of said body whereby said hooks in exposed position occupy an angular position relative to said body portion.

7. An artificial bait including a hollow body, a pair of hooks rotatably movable about an axis parallel to the longitudinal axis of said body into housed position within said body and exposed position without said body and means for imparting movement to said hooks.

8. An artificial bait including a hollow body composed of segments movable relative to each other, a shaft arranged within the body and movable into retracted and extended positions relative to the body, hooks carried by the shaft and housed between the body segments when the shaft is in retracted position and exposed when the shaft is in extended position, resilient means tending to move the shaft into extended position, means for rotating said shaft during its movement about an axis parallel to the longitudinal axis of said body portion and means for latching the shaft in retracted position when the body segments are in one position relatively to each other, said means being adapted to allow a movement of the shaft into extended position when the body segments are removed into another position relatively to each other, substantially as described.

EZEKIEL M. SMITH.